(12) United States Patent
Farjadpour et al.

(10) Patent No.: US 9,052,434 B2
(45) Date of Patent: Jun. 9, 2015

(54) ZERO GROUP-VELOCITY MODES IN CHALCOGENIDE HOLEY PHOTONIC CRYSTAL FIBERS

(75) Inventors: Ardavan Farjadpour, Cambridge, MA (US); John D. Joanopoulos, Belmont, MA (US); Steven G. Johnson, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1242 days.

(21) Appl. No.: 12/713,464

(22) Filed: Feb. 26, 2010

(65) Prior Publication Data

US 2010/0221537 A1    Sep. 2, 2010

Related U.S. Application Data

(60) Provisional application No. 61/156,638, filed on Mar. 2, 2009.

(51) Int. Cl.
*G02B 6/02* (2006.01)
*D02G 3/00* (2006.01)
*B05D 5/06* (2006.01)

(52) U.S. Cl.
CPC ........ *G02B 6/02328* (2013.01); *G02B 6/02347* (2013.01)

(58) Field of Classification Search
USPC .................................. 428/375, 376, 392, 398
See application file for complete search history.

(56) References Cited

U.S. PATENT DOCUMENTS

| | | | | |
|---|---|---|---|---|
| 5,187,461 | A * | 2/1993 | Brommer et al. | 333/219.1 |
| 6,301,420 | B1 * | 10/2001 | Greenaway et al. | 385/126 |
| 6,640,034 | B1 * | 10/2003 | Charlton et al. | 385/122 |
| 6,778,746 | B2 * | 8/2004 | Charlton et al. | 385/122 |
| 6,895,154 | B2 * | 5/2005 | Johnson et al. | 385/125 |
| 6,901,194 | B2 * | 5/2005 | Charlton et al. | 385/122 |
| 6,909,729 | B2 * | 6/2005 | Ibanescu et al. | 372/6 |
| 7,734,137 | B2 * | 6/2010 | Bennett et al. | 385/126 |
| 2002/0021878 | A1 * | 2/2002 | Allan et al. | 385/129 |
| 2002/0126713 | A1 | 9/2002 | Ibanescu et al. | |
| 2002/0176676 | A1 * | 11/2002 | Johnson et al. | 385/125 |
| 2006/0165984 | A1 * | 7/2006 | Miguez et al. | 428/375 |
| 2007/0274652 | A1 | 11/2007 | Dangui et al. | |
| 2008/0170830 | A1 * | 7/2008 | Guan et al. | 385/125 |
| 2010/0221537 | A1 * | 9/2010 | Farjadpour et al. | 428/376 |

OTHER PUBLICATIONS

Andreani et al., "Photonic crystal slabs with a triangular lattice of triangular holes investiaged using a guided mode expansion method" 2008.*
Cregan et al., "Single-Mode Photonic Band GAp Guidance of Light in Air"; (1999) Science; 285, 1537-1539.*
Saitoh et al., "Artificial Defects as Ingredients for Synthesizing Holey Fibers with Large Mode Area and Flat Chromatic Dispersion: An Emergining Technology for High Speed Transmission Platforms"; OpticslnfoBase; 2006, pp. 1-3.*

(Continued)

*Primary Examiner* — Jill Gray
(74) *Attorney, Agent, or Firm* — Gesmer Updegrove LLP (57) ABSTRACT

A fiber structure for propagating one or more zero group-velocity modes is provided. The fiber structure includes a cladding arrangement comprising a photonic crystal having a complete bandgap at a specified index. A core is formed in a selective region of the cladding arrangement. The core allows the propagation of the one or more group-velocity modes.

20 Claims, 6 Drawing Sheets

(56) References Cited

OTHER PUBLICATIONS

Notification of Transmittal of the International Search Report and the Written Opinion of the International Searching Authority mailed Aug. 31, 2010 in connection with PCT/US2010/025517.

Ibanescu et al. "Microcavity confinement based on an anomalous zero group-velocity waveguide mode," Optics Letters, vol. 30, No. 5, Mar. 2005, pp. 552-554.

Ibanescu et al., "Anamalous Dispersion Relations by Symmetry Breaking in Axially Uniform Waveguides", Physical Review Letters, vol. 92, No. 6, Feb. 13, 2004, 4 pages.

Pottage, "Robust photonic band gaps for hollow core guidance in PCF made from high index glass" Optics Express, vol. 11, No. 22, Nov. 3, 2003, pp. 2854-2861.

Russel, "Photonic Crystal Fibers" Review Applied Physics, Science, Jan. 17, 2003, vol. 229, pp. 358-362.

\* cited by examiner

ZERO GROUP-VELOCITY MODES IN CHALCOGENIDE HOLEY PHOTONIC CRYSTAL FIBERS

PRIORITY INFORMATION

This application claims priority from provisional application Ser. No. 61/156,638 filed Mar. 2, 2009, which is incorporated herein by reference in its entirety.

SPONSORSHIP INFORMATION

This invention was made with government support awarded by the NSF under Grant No. DMR-0819762 and by the ARO under Grant No. W911NF-07-D-0004. The government has certain rights in the invention.

BACKGROUND OF THE INVENTION

The invention is related to the field of photonic crystal holey fibers, and in particular to obtaining zero group-velocity modes in photonic crystal holey fibers.

Photonic crystal holey fibers have been of great interest for a variety of different applications, mainly using silica or polymers with low index contrasts (1.5; 1). Researchers have also studied photonic crystal fiber-like geometries with high index contrast materials (eg. Si or GaAs, index 3.4) and shown that they support interesting zero group-velocity modes, but such modes have not been described for fibers made of easily drawable materials.

Holey fibers, formed by a lattice of air holes in the fiber cross section, are best known for supporting "finger-like" band gaps opening towards the high-frequency regime, which can open even for arbitrarily low index contrasts. However, these gaps close before reaching a zero propagation constant $\beta$, and the guided modes that they support have all been found to have nonzero group-velocity.

SUMMARY OF THE INVENTION

According to one aspect of the invention, there is provided a fiber structure for propagating one or more zero group-velocity modes. The fiber structure includes a cladding arrangement comprising a photonic crystal having a complete bandgap at a specified index. A core is formed in a selective region of the cladding arrangement. The core allows the propagation of the one or more zero group-velocity modes.

According to another aspect of the invention, there is provided a method of forming a fiber structure for propagating one or more zero group-velocity modes. The method includes providing a cladding arrangement comprising a photonic crystal having a complete bandgap at a specified index. Moreover, the method includes forming a core in a selective region of the cladding arrangement. The core allows the propagation of the one or more zero group-velocity modes.

DETAILED DESCRIPTION OF THE INVENTION

The invention demonstrates the possibility of obtaining zero group-velocity modes in uniform fiber geometries using chalcogenide glasses (index 2.8), which have proven amenable to drawn microstructured fibers. In particular, the invention shows that a holey photonic crystal holey fiber (holey fiber) with chalcogenide-glass index contrast can be designed to have a complete gap at a propagation constant $\beta=0$ that also extends into the non-zero $\beta$ region. This type of bandgap, previously identified only at index contrasts unattainable in glasses, opens up a regime for guiding zero group-velocity modes not possible in holey fibers with the more common finger-like gaps originating from $\beta \rightarrow \infty$. Such modes could be used to enhance nonlinear and other material interactions, such as for hollow-core fibers in gas-sensor applications.

Figure 1:
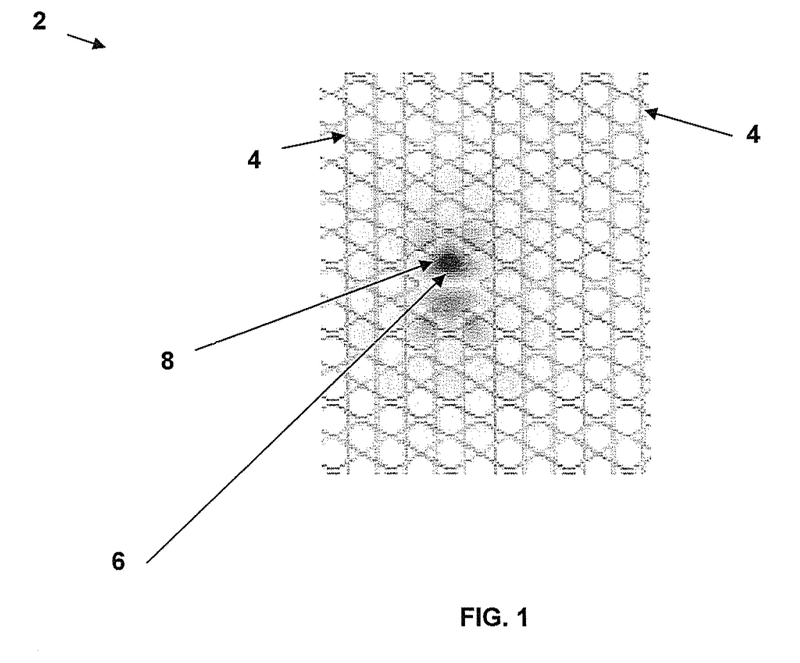
FIG. 1 is a schematic diagram illustrating a holey fiber used in accordance with the invention.

The propagating modes of a holey fiber with a constant permittivity cross-section $\in(x, y)$ can be described as some xy electric field pattern $E(x, y)$ multiplied by $e^{i(\beta z - \omega t)}$, where $\beta$ is the propagation constant and $\omega$ is the frequency. A holey fiber 2 includes a periodic cladding 4 (usually a triangular lattice of air holes), as well as a core 6 (solid or hollow) that breaks the periodicity and supports guided modes 8, as shown in FIG. 1. The periodic cladding 4 can also include a triangular lattice of hexagonal-shaped air holes as well.

Figure 2A:
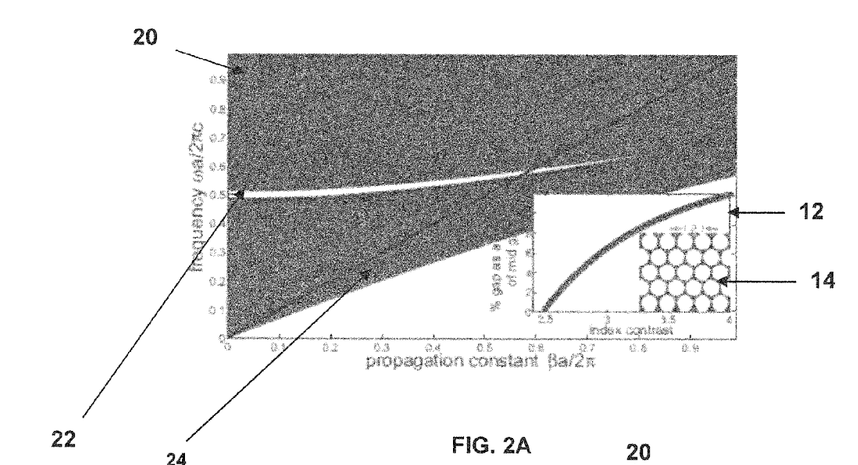
FIGS. 2A-2B are schematic diagram illustrating the dispersion relation for various triangular lattice structures used in accordance with invention.
Figure 2B:
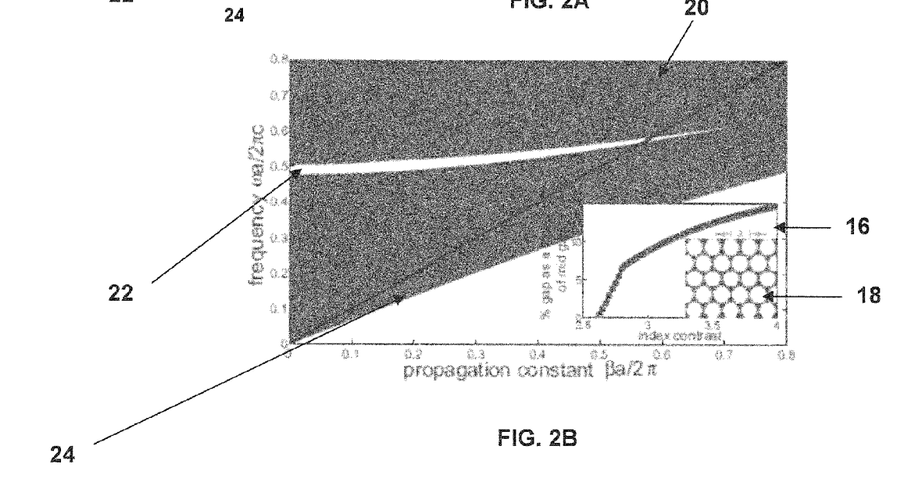
Figure 3A:
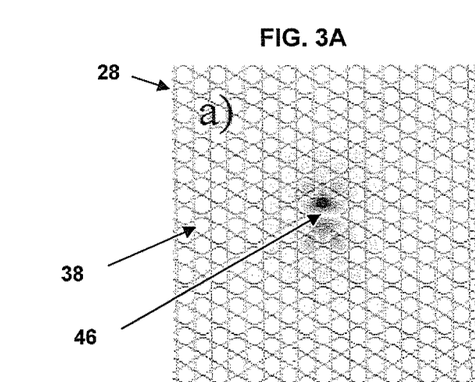
FIGS. 3A-3D are schematic diagrams illustrating holey fibers having respective modes propagating in their cores.
Figure 3B:
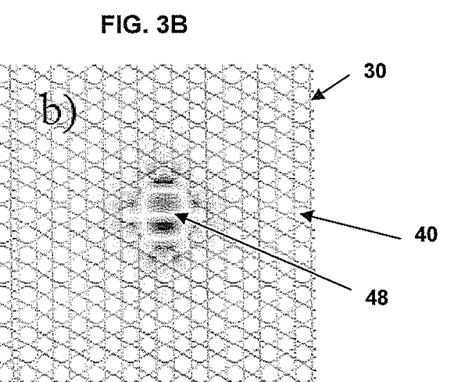
Figure 3C:
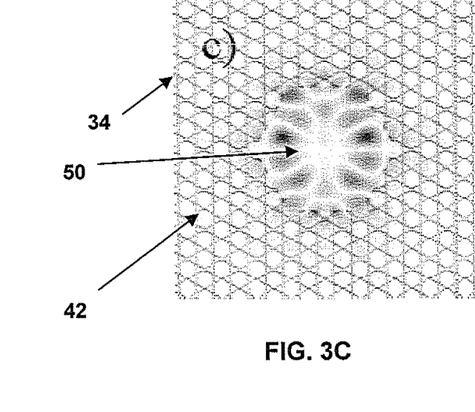
Figure 3D:
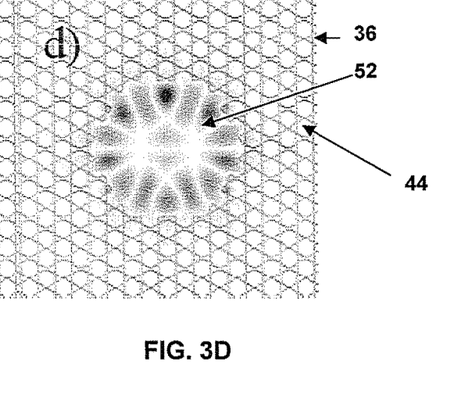

The dispersion relation, the plot of $\omega(\beta)$ for all solutions, can be divided into several regions as shown in FIGS. 2A-2B. In particular, FIG. 2A illustrates the projected band diagram (frequency vs. propagation constant), for a triangular lattice of holes 14 as shown by the inset 12. Also, FIG. 2B shows a projected band diagram (frequency vs. propagation constant), for a triangular lattice of hexagonal-shaped holes 18 as shown by inset 16.

Both the projected band diagrams illustrate a continuous (shaded) region, the light cone 20, consisting of all cladding (non-guided) modes that can propagate in the cladding far from the core. There are also regions 22 of $(\beta,\omega)$ that have no cladding modes: band gaps within the light cone 20, which can confine gap-guided modes, and also an empty space 24 below the light cone 20 that can confine index-guided modes. The guided modes, exponentially localized to the vicinity of the core, appear as discrete bands $\omega_n(\beta)$ within the gaps and/or under the light cone 20. Technically, in a finite-size fiber the gap-guided modes are leaky, but as this leakage rate decreases exponentially with the periodic cladding thickness it can be made negligible in practical contexts.

In order to confine light in an air core, the gaps and guided modes must lie above the light line $\omega=c\beta$ of air (since modes below the light line of air are evanescent in air regions). Normally, these guided bands are monotonically increasing, corresponding to a positive group-velocity $d\omega/d\beta$ and there is evidence that this is always the case for index-guided modes with a homogeneous cladding. Zero group-velocity typically occurs only at values of $\beta$ that have $z \rightarrow -z$ reflection symmetry (with rare exceptions), which in a uniform—cross-section fiber only occurs at $\beta=0$. Index-guided modes are not possible at $\beta=0$ they become rapidly more weakly confined at $\beta \rightarrow 0$, so one must consider bandgap-guided modes.

Unfortunately, the typical gaps that arise in holey fibers have their origin in the $\beta \to \infty$ limit (where the field patterns approximate those of a two dimensional (2D) metallic system), and are observed to close well before $\beta=0$ is reached. The $\beta=0$ point corresponds to a two-dimensional (2D) photonic crystal with in-plane propagation, whose modes can be decomposed into TE (E in xy plane) and TM (E in z direction) polarizations. Typically, low-contrast materials such as silica/air will have a gap only for one of these polarizations (e.g. TE for air holes). Such a single-polarization two dimensional (2D) gap is not useful for guiding modes in a fiber, because the TE/TM distinction disappears for $\beta \neq 0$ and hence a single-polarization gap disappears.

On the other hand, if one can obtain an overlapping TE/TM gap at $\beta=0$, which typically requires higher index contrasts, then it should be expected to persist for a nonzero range of $\beta$, even after the TE/TM distinction disappears. One can demonstrate that this, in fact, occurs, for index contrasts attainable in chalcogenide glasses that have been used for fiber drawing. The resulting gap around $\beta=0$ therefore supports guided modes that attain zero group-velocity as $\beta \to 0$.

Several other mechanisms have been proposed for creating zero group-velocity modes in fibers. Bragg fibers, consisting of concentric rings of two or more materials forming a one-dimensional photonic crystal, have a gap originating at $\beta=0$ and consequently their guided modes attain zero group-velocity at this point. Although Bragg fibers do not have a complete 2D gap, this is compensated for by the rotational symmetry which eliminates modes propagating in the azimuthal direction at large radii. These fiber modes resemble those of hollow metallic waveguides, which also have zero group-velocity at their cutoff frequencies.

However, Bragg fibers require two solid materials in the cladding, which makes fabrication more challenging, while metallic waveguides become lossy at infrared frequencies. With a traditional core-clad fiber or with a holey fiber, zero group-velocity can instead be attained by periodic modulation of the structure along the axial direction. For example, a fiber Bragg grating is formed by a weak modulation of the refractive index "burned" in by a photorefractive effect. Because this index modulation is typically much less than 1%, however, the low group-velocity bandwidth is small in fiber Bragg gratings. Furthermore, one can only modulate the index of a solid material, greatly reducing the grating effect for modes confined in an air core.

Others have proposed that spherical particles can be introduced into an air core in order to create a periodic modulation, but such structures seem challenging to produce on large scales compared to drawn fibers. Previous work showed that semiconductor (silicon) index contrasts (3.5:1) could support zero group-velocity modes in fiber-like geometries, and here the existence and utility of analogous modes with conventional fiber materials is highlighted. Furthermore, these zero group-velocity modes can even be converted into backwards-wave and ultra-flat bands by careful tuning of the waveguide core, and one can expect that similar phenomena should be possible in chalcogenide fibers and other lower-contrast materials.

One 2D photonic crystal structure that is well known to have a complete gap for sufficiently large index contrast is a triangular lattice (period a) of cylindrical air holes (radius r) in dielectric, similar to the geometry of many fabricated holey fibers as shown in inset 12 of FIG. 2A. This geometry with r=0.45a turns out to have a 4.4% complete gap at $\beta=0$ for a refractive index of 2.8, chosen to correspond to that of a typical chalcogenide glass (e.g., As2Se3 at $\lambda=1.5$ μm). Also, a slightly modified 2D photonic crystal having a triangular lattice of dielectric rods in air connected by thin veins resembling hexagonal-shaped holes as shown in inset 16 of FIG. 2B can also be used. The gap size was optimized over two parameters, rod radius and vein thickness, yielding a 5.4% gap-to-midgap ratio for a rod radius of 0.16a and a vein thickness of 0.2a. The gap in this structure persisted for index contrasts as low as 2.6:1, as shown in the inset 16 of FIG. 2B. The Maxwell eigenproblem was solved with an iterative (conjugate gradient) method in a planewave basis. The resulting band diagrams, with gaps that extend over a range of nonzero $\beta$, are shown in FIGS. 2A-2B. Since the modified structure of FIG. 2B has a slightly larger gap, this structure is focused upon and similar results can be obtained for a cylindrical-hole structure.

An air core can be formed by removing some dielectric material to develop a hexagonal-shaped air core with an inscribed-circle diameter D in a 15a by 15a supercell. This supercell is large enough that, for all guided modes considered here, the guided-mode field has decayed to negligible values by the edge of the supercell and hence the finite supercell size is irrelevant. Depending on the core diameter D, different types of modes with varying symmetry and degrees of confinement can be localized. One can choose D to satisfy two criteria. First, the confined mode should be of the right symmetry to be excited by an incident planewave source—technically, this means that the mode is doubly degenerate and belongs to the $\Gamma_6$ representation of the sixfold (C6v) symmetry group of the hexagonal core.

As D is varied, one can obtain a variety of different $\Gamma_6$ defect modes, as shown in FIGS. 3A-3D. In particular, FIGS. 3A-3D show doubly-degenerate $\Gamma 6$ defect modes 46, 48, 50, 52 in holey fibers 28, 30, 34, 36 having claddings 38, 40, 42, 44 comprising triangular lattices of hexagonal-shaped holes with periodicity a obtained by varying inscribed defect diameter D of a hexagonal-shaped air core. In particular, the holey fiber 28 has a defect diameter of D=1.6a (fundamental-like) and holey fiber 30 has a defect diameter of D=3.2a. Also, the holey fiber 34 has a defect diameter of D=6.2a, and the holey fiber 36 has a defect diameter D=6.76a. For small D, one can obtain fundamental-like fields patterns as in FIG. 3A, whereas for larger D one can obtain more complicated field patterns that are, however, better confined in the air core as in FIG. 3D.

Figure 4:
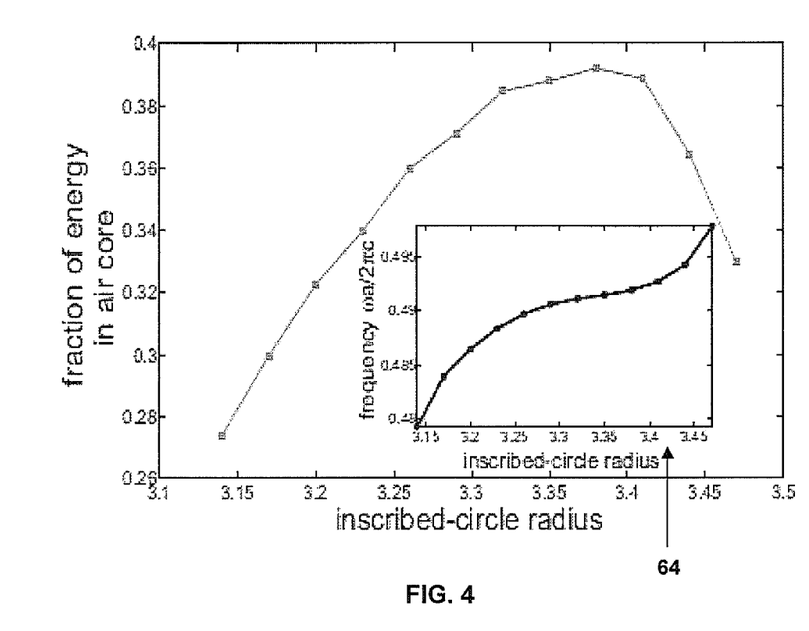
FIG. 4 is a graph illustrating the fraction of electric-field energy $\in|E|^2$ in a hexagonal-shaped air core.
Figure 5:
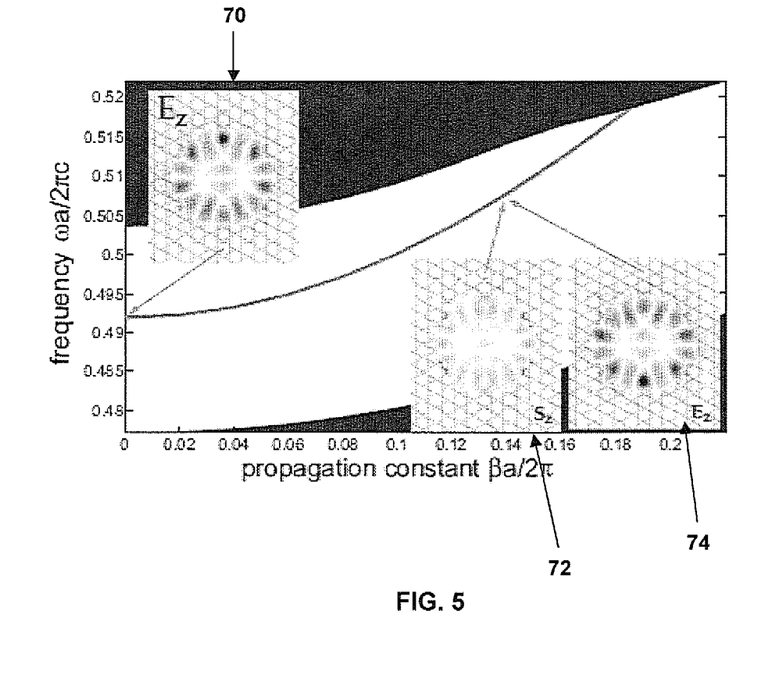
FIG. 5 is a graph illustrating the dispersion of air-core guided mode in gap of FIG. 2B with insets showing electric-field Ez and Poynting vector Sz.

For a given mode with strong air-core confinement, one can then choose D to maximize the fraction of the electric-field energy ($\in |E|^2$) in the air core at $\beta=0$ while also eliminating the influence of surface states, as shown in FIG. 4. Also, FIG. 4 shows an inset 64 illustrating the relationship between guided mode and core radius at frequency ω at $\beta=0$. This is desirable in air-core fiber applications to reduce absorption loss from the cladding and increase light-gas interactions. In particular, one can choose the mode from FIG. 3D (D=6.76a) for specificity, and the resulting structure is shown along with its dispersion relation in FIG. 5. Also shown in FIG. 5 are the insets 70, 72, 74 showing the electric field Ez and Poynting vector Sz at various axial wavevector points. The field profile (which is TM at $\beta=0$) is still strongly confined at a non-zero axial wavevector ($\beta a/2\pi=0.14$), as shown by the inset 74.

One source of loss is the material absorption in the cladding, which for bulk As2Se3 is about 36 dB/m at $\lambda=1.5$ μm. For a guided mode in the hollow core, this absorption loss is suppressed by a factor of $fc/v_g n$, where f is the fraction of the electric-field energy in the cladding, vg is the group-velocity, and n is the cladding refractive index. For the mode of FIG. 5 at $\beta a/2\pi=0.14$, where vg=0.22c and f=0.19, the absorption loss of the mode is therefore 11.1 dB/m, which is sufficient for short-distance fiber devices. Lower loss could be obtained by operating at a longer wavelength such as 3 or 10 µm, where the losses of chalcogenide are much lower while the index of refraction remains larger than 2.7.

Another practical challenge in all slow-light structures is coupling from a non-slow source; one very general technique is a gradual "taper" transition to a higher-velocity waveguide, for example by gradually scaling the structure to a larger diameter to shift the band edge down to increase the group-velocity at the operating $\omega$. Alternatively, rather than resealing the whole structure, gradually decreasing the core diameter while keeping the cladding unchanged turns out to shift the band edge down in this geometry.

Figure 6:
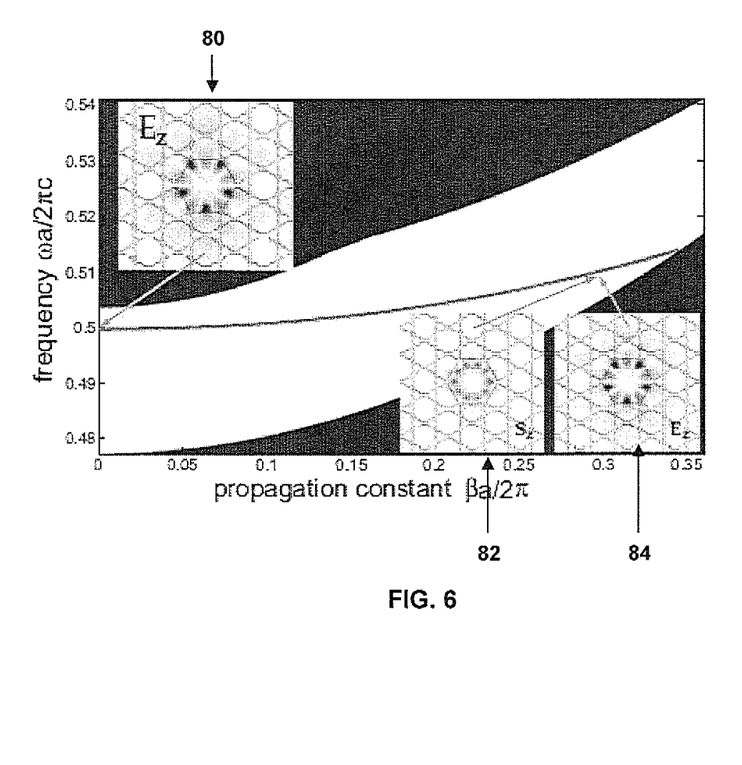
FIG. 6 is a graph illustrating the dispersion of solid-core guided mode in gap of FIG. 2B with insets showing electric-field Ez and Poynting vector Sz.

In contrast to air cores, solid (dielectric-filled) cores can be used to enhance interactions and nonlinearities with solid materials, such as for fiber lasers. Here, one can form a small solid core by filling a hexagonal-shaped core (D=1.62a) with dielectric. This confines a doubly-degenerate mode with an extremely flat dispersion relation, in addition to its zero group-velocity point at $\beta=0$, as shown in FIG. 6. This extreme flatness could potentially be transformed into a higher-order (e.g. quartic) band edge or even a concave backward-wave band-edge, via proper tuning of the solid core geometry. The inset 80 shows the electric field Ez at $\beta=0$ and insets 82, 84 illustrate the Poynting vector Sz and electric field Ez at $\beta a/2\pi=0.3$ where the profile is still confined at a non-zero axial wavevector.

The invention provides a holey photonic crystal fiber with chalcogenide-glass index contrast having a complete gap at a propagation constant $\beta=0$ that also extends into the non-zero $\beta$ region. This allows for guiding zero group-velocity modes not possible in holey fibers with the more common finger-like gaps originating from $\beta\to\infty$. These modes allow one to enhance nonlinear and other material interactions permissible for use in hollow-core fibers.

Although the present invention has been shown and described with respect to several preferred embodiments thereof, various changes, omissions and additions to the form and detail thereof, may be made therein, without departing from the spirit and scope of the invention.

What is claimed is:

1. A fiber structure for propagating one or more zero group-velocity modes comprising:
    a cladding arrangement comprising a two-dimensional photonic crystal that includes a holey fiber configuration having a complete bandgap with a chalcogenide-glass refractive index contrast below 3.3:1, the holey fiber configuration includes a defect having a specified diameter, said crystal supports TE and TM polarized solutions at a propagation constant $\beta=0$; and
    a core formed in a selective region of the cladding arrangement, said core allowing the propagation of the one or more zero group-velocity modes by an overlapping TE/TM gap at $\beta=0$ that also extends into a non-zero $\beta$ region with index contrasts attainable of said chalcogenide-glass for fiber drawing, the specified diameter of the defect is sized so as to allow confinement of field patterns in the core.

2. The fiber structure of claim 1, wherein said cladding arrangement comprises chalcogenide glass.

3. The fiber structure of claim 1, wherein said cladding arrangement comprises a triangular lattice of air holes.

4. The fiber structure of claim 1, wherein said cladding arrangement comprises a triangular hexagonal lattice of air holes.

5. The fiber structure of claim 1, wherein said core comprises an air core.

6. The fiber structure of claim 1, wherein said core comprises a solid core.

7. The fiber structure of claim 6, wherein said solid core comprises a dielectric material.

8. The fiber structure of claim 1, wherein said core allows modes having non-zero axial wavevector values to propagate.

9. The fiber structure of claim 1, wherein said core breaks symmetry with said cladding arrangement.

10. The fiber structure of claim 1, wherein said refractive index contrast is below 3:1.

11. A method of forming a fiber structure for propagating one or more zero group-velocity modes comprising:
    providing a cladding arrangement comprising a two-dimensional photonic crystal that includes a holey fiber configuration having a complete bandgap with a chalcogenide-glass refractive index contrast below 3.3:1, the holey fiber configuration includes a defect having a specified diameter said crystal supports TE and TM polarized solutions at a propagation constant $\beta=0$; and
    forming a core in a selective region of the cladding arrangement, said core allowing the propagation of the one or more group-velocity modes by an overlapping TE/TM gap at $\beta=0$ that also extends into a non-zero $\beta$ region with index contrasts attainable of said chalcogenide-glass for fiber drawing, the specified diameter of the defect is sized so as to allow confinement of field patterns in the core while maximizing the fraction of energy therein and also eliminating the influence of surface states.

12. The method of claim 11, wherein said cladding arrangement comprises chalcogenide glass.

13. The method of claim 11, wherein said cladding arrangement comprises a triangular lattice of air holes.

14. The method of claim 11, wherein said cladding arrangement comprises a triangular hexagonal lattice of air holes.

15. The method of claim 11, wherein said core comprises an air core.

16. The method of claim 11, wherein said core structure comprises a solid core.

17. The method of claim 16, wherein said solid core comprises a dielectric material.

18. The method of claim 11, wherein said core allows modes having non-zero axial wavevector values to propagate.

19. The method of claim 11, wherein said core breaks symmetry with said cladding arrangement.

20. The method of claim 11, wherein said refractive index contrast is below 3:1.

* * * * *